United States Patent [19]
Schilling

[11] Patent Number: 5,263,045
[45] Date of Patent: * Nov. 16, 1993

[54] SPREAD SPECTRUM CONFERENCE CALL SYSTEM AND METHOD

[75] Inventor: Donald L. Schilling, Sands Point, N.Y.

[73] Assignee: InterDigital Technology Corporation, Wilmington, Del.

[ * ] Notice: The portion of the term of this patent subsequent to Nov. 24, 2009 has been disclaimed.

[21] Appl. No.: 779,183

[22] Filed: Oct. 21, 1991

Related U.S. Application Data

[63] Continuation-in-part of Ser. No. 622,235, Dec. 5, 1990, and a continuation-in-part of Ser. No. 626,109, Dec. 14, 1990, and a continuation-in-part of Ser. No. 715,835, Jun. 17, 1991.

[51] Int. Cl.$^5$ .............................................. H04K 1/00
[52] U.S. Cl. ........................................... 375/1; 380/34
[58] Field of Search ...................... 380/34; 375/1, 38; 455/33.1, 34.1, 59, 103; 379/59, 60

[56] References Cited

U.S. PATENT DOCUMENTS

| | | |
|---|---|---|
| 3,731,198 | 5/1973 | Blasbalg ................................. 375/1 |
| 3,831,013 | 8/1974 | Alsup et al. . |
| 3,900,721 | 8/1975 | Speiser et al. . |
| 4,112,372 | 9/1978 | Holmes et al. . |
| 4,222,115 | 9/1980 | Cooper et al. . |
| 4,238,850 | 12/1980 | Vance . |
| 4,247,942 | 1/1981 | Hauer . |
| 4,279,018 | 7/1981 | Carson ................................... 375/1 |
| 4,392,232 | 7/1983 | Andren et al. . |
| 4,418,393 | 11/1983 | Zscheile, Jr. . |
| 4,418,425 | 11/1983 | Fennel, Jr. et al. . |
| 4,425,642 | 1/1984 | Moses et al. . |
| 4,455,651 | 6/1984 | Baran . |
| 4,479,226 | 10/1984 | Prabhu et al. . |
| 4,512,013 | 4/1985 | Nash et al. . |
| 4,523,311 | 6/1985 | Lee et al. . |
| 4,553,130 | 11/1985 | Kato . |
| 4,563,774 | 1/1986 | Gloqe . |
| 4,606,039 | 8/1986 | Nicolas et al. . |
| 4,612,637 | 9/1986 | Davis et al. . |
| 4,621,365 | 11/1986 | Chiu . |
| 4,647,863 | 3/1987 | Skudera, Jr. et al. . |
| 4,649,549 | 3/1987 | Halpern et al. . |
| 4,653,069 | 3/1987 | Roeder . |

(List continued on next page.)

Primary Examiner—Tod R. Swann
Attorney, Agent, or Firm—David Newman & Associates

[57] ABSTRACT

A spread spectrum communications system for use over a communications channel, including a transmitter-generic-chip-code generator, a transmitter-message-chip-code generator, an EXCLUSIVE-OR gate, a combiner, a transmitter, a receiver-generic-chip-code generator, a generic mixer, a generic-bandpass filter, a receiver-message-chip-code generator, a message mixer, a message-bandpass filter, and a synchronous detector. The transmitter-generic-chip-code generator generates a generic-chip-code signal and the transmitter-message-chip-code generator generates a message-chip-code signal. The EXCLUSIVE-OR gate spread-spectrum processes message data with the message-chip-code signal to generate a spread-spectrum signal. The combiner combines the generic-chip-code signal with the spread-spectrum signal. The transmitter transmits the combined generic-chip-code signal and spread-spectrum signal, on a carrier signal over the communications channel as a spread-spectrum-communications signal. The receiver-generic-chip-code generator generates a replica of the generic-chip-code signal. The generic mixer recovers the carrier signal from the spread-spectrum-communications signal. The receiver-message-chip-code generator generates a replica of the message-chip-code signal. The message mixer despreads the spread-spectrum-communications signal as a modulated-data signal. The tracking and acquisition circuit uses the recovered carrier signal for synchronizing the replicas of the generic-chip-code signal to the recovered carrier signal. The synchronous detector synchronously demodulates the modulated-data signal as received data.

17 Claims, 10 Drawing Sheets

U.S. PATENT DOCUMENTS

| | | |
|---|---|---|
| 4,660,164 | 4/1987 | Leibowitz . |
| 4,672,605 | 6/1987 | Hustig et al. . |
| 4,672,629 | 6/1987 | Beier . |
| 4,672,658 | 6/1987 | Kauehrad et al. . |
| 4,675,839 | 6/1987 | Kerr . |
| 4,680,785 | 7/1987 | Akiyama et al. . |
| 4,691,326 | 9/1987 | Tsuchiya . |
| 4,697,260 | 9/1987 | Grauel et al. . |
| 4,703,474 | 10/1987 | Foschini et al. . |
| 4,707,839 | 11/1987 | Andren et al. . |
| 4,718,080 | 1/1988 | Serrano et al. . |
| 4,730,340 | 3/1988 | Frazier, Jr. . |
| 4,742,512 | 5/1988 | Akashi et al. . |
| 4,759,034 | 7/1988 | Nagazumi . |
| 4,789,983 | 12/1988 | Acampora et al. . |
| 4,799,252 | 1/1989 | Eizenhoffer et al. ............... 379/59 |
| 4,799,253 | 1/1989 | Stern et al. . |
| 4,805,208 | 2/1989 | Schwartz . |
| 4,807,222 | 2/1989 | Amitay . |
| 4,837,802 | 6/1989 | Higashiyama et al. . |
| 4,850,036 | 7/1989 | Smith . |
| 4,860,307 | 8/1989 | Nakayama . |
| 4,866,732 | 9/1989 | Carey et al. . |
| 4,894,842 | 1/1990 | Broekhoven et al. . |
| 4,901,307 | 2/1990 | Gilhousen et al. . |
| 4,914,651 | 4/1990 | Lusignan . |
| 4,922,506 | 5/1990 | McCallister et al. . |
| 4,930,140 | 5/1990 | Cripps et al. . |
| 4,932,037 | 6/1990 | Simpson et al. . |
| 4,969,159 | 11/1990 | Belcher et al. . |
| 4,977,577 | 12/1990 | Arthur et al. . |
| 4,977,578 | 12/1990 | Ishigaki et al. . |
| 5,005,169 | 4/1991 | Bronder et al. . |
| 5,016,255 | 5/1991 | Dixon et al. . |
| 5,016,256 | 5/1991 | Stewart . |
| 5,022,047 | 6/1991 | Dixon et al. . |
| 5,023,887 | 6/1991 | Takeuchi et al. . |
| 5,029,181 | 7/1991 | Endo et al. . |
| 5,040,238 | 8/1991 | Comroe et al. . |
| 5,048,052 | 9/1991 | Hamatsu et al. . |
| 5,056,109 | 10/1991 | Gilhousen et al. . |
| 5,073,900 | 12/1991 | Mallinckrodt .................... 455/33 X |
| 5,166,951 | 11/1992 | Schilling ................................ 375/1 |
| 5,179,572 | 1/1993 | Schilling ................................ 375/1 |

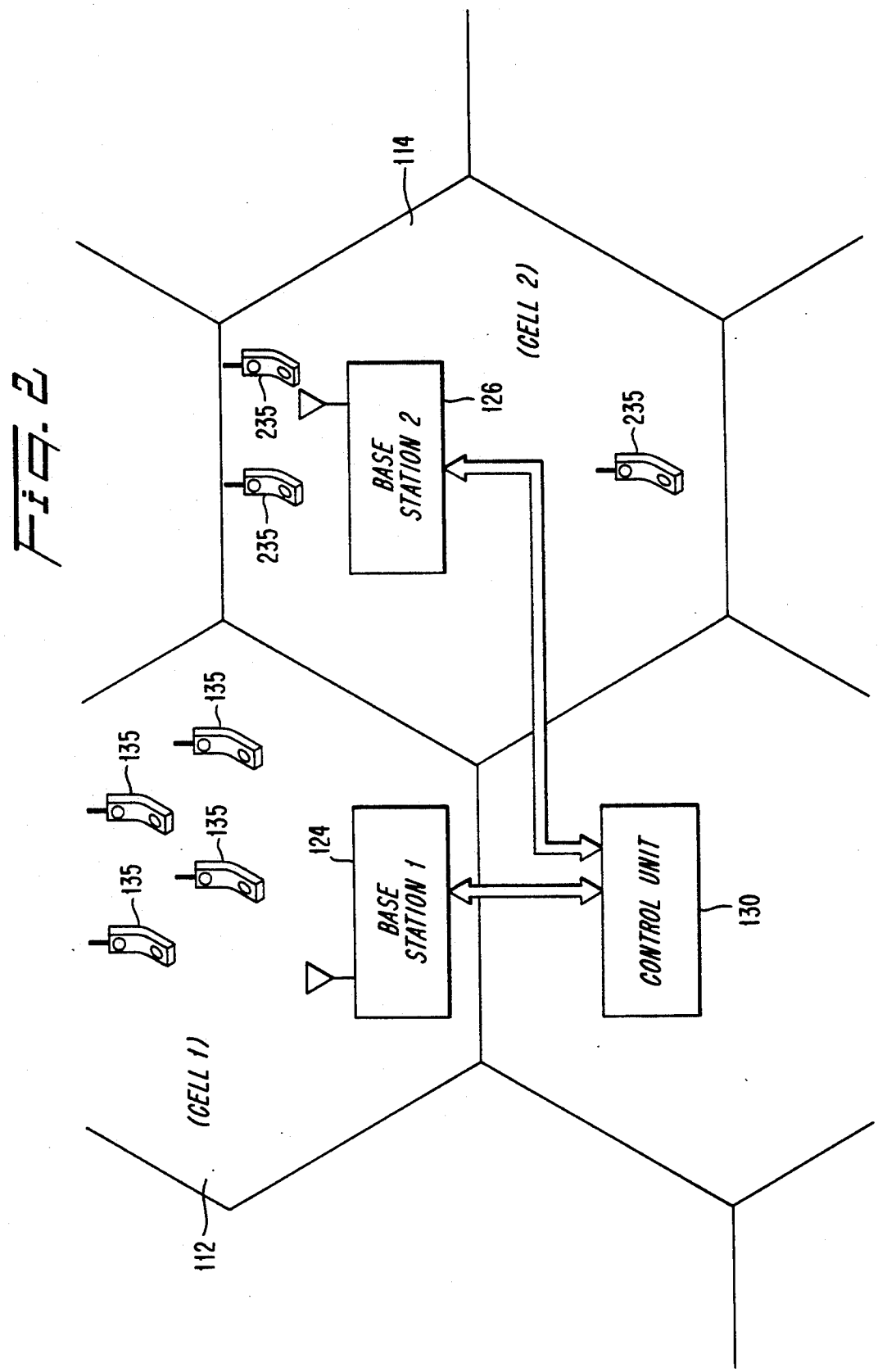

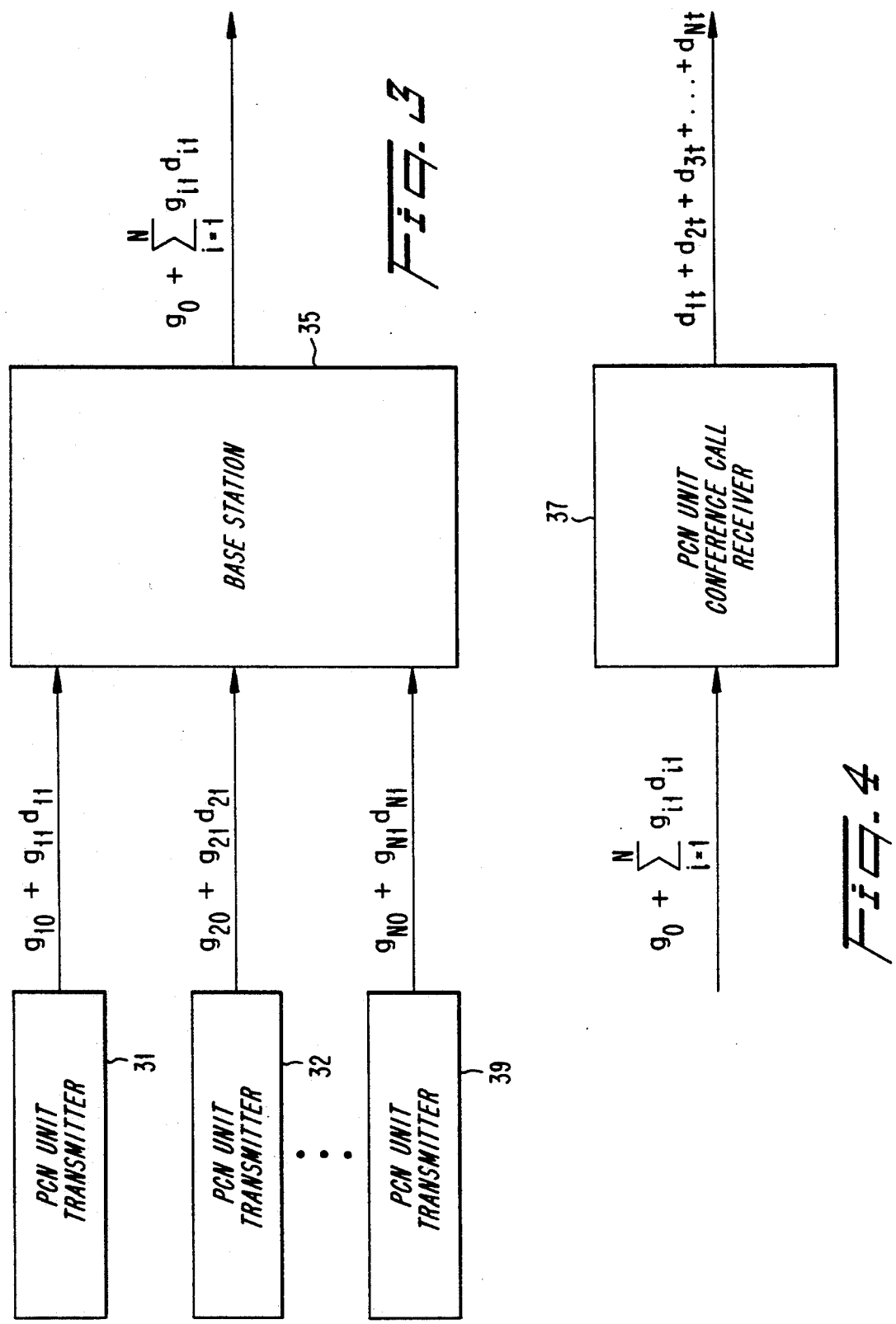

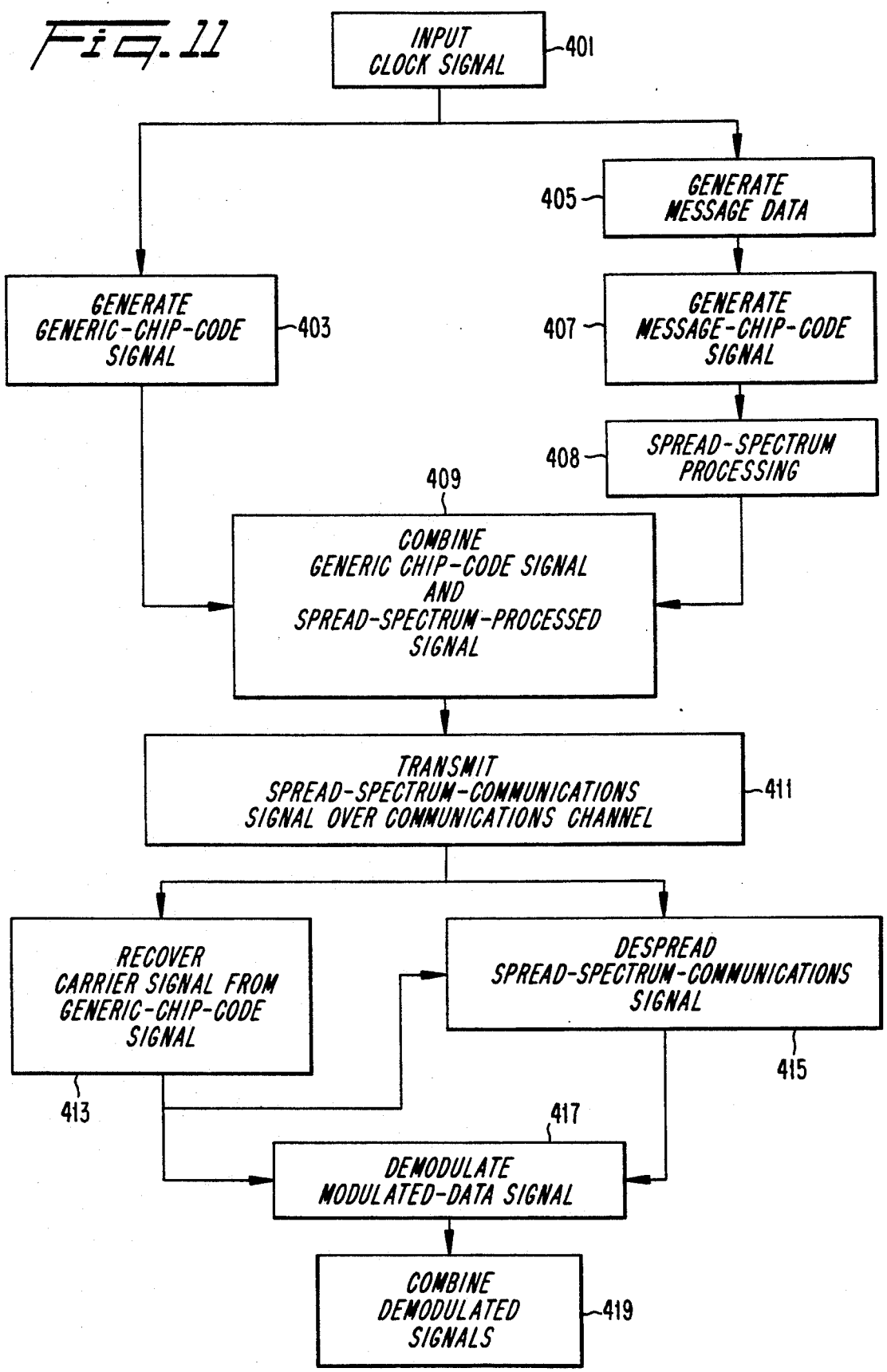

SPREAD SPECTRUM CONFERENCE CALL SYSTEM AND METHOD

RELATED PATENTS

This is a continuation-in-part patent application of: U.S. patent application having Ser. No. 07/622,235, filing date Dec. 5, 1990, entitled SPREAD SPECTRUM CDMA COMMUNICATIONS SYSTEM by Donald L. Schilling; U.S. patent application having Ser. No. 07/626,109, filing date Dec. 14, 1990, entitled SYNCHRONOUS SPREAD-SPECTRUM COMMUNICATIONS SYSTEM AND METHOD; and, U.S. patent application having Ser. No. 07/715,835, filing date Jun. 17, 1991, entitled SPREAD SPECTRUM CONFERENCE CALLING SYSTEM AND METHOD.

BACKGROUND OF THE INVENTION

This invention relates to spread-spectrum communications and more particularly to a system and method for conference calling with a multiplicity of spread-spectrum signals.

DESCRIPTION OF THE PRIOR ART

Referring to FIG. 1, message data, d(t), are processed by spread-spectrum data modulator 51, using a message chip code signal, $g_1(t)$, to generate a spread-spectrum data signal. The spread-spectrum data signal is processed by transmitter 52 using a carrier signal at a carrier frequency, $f_o$, and transmitted over communications channel 53.

At a receiver, a spread-spectrum demodulator 54 despreads the received spread-spectrum signal, and the message data are recovered by synchronous data demodulator 60 as a received-message signal. The synchronous data demodulator 60 uses a reference signal for synchronously demodulating the despread spread-spectrum signal. The square-law device 55, bandpass filter 56 and frequency divider 57 are well known in the art for generating a reference signal from a received modulated data signal. A Costas Loop or other reference signal generating circuit is also adequate.

The spread-spectrum system of FIG. 1 is limited to a single communications channel, and would not work well for receiving a multiplicity of spread-spectrum signals in a fading environment. In a conference calling situation, where a plurality of users desire to speak to each other, there is a need for an economical method and apparatus for implementing such a system.

Additionally, in a fading channel, such as the ionosphere, a city or any channel containing multipath, or more generally, any channel in which the received signal's amplitude fluctuates with time, synchronous demodulation is not practical since the phase of the incoming signal typically is not the same as the phase of the reference. Thus, a need exists for a conference calling system which works in a fading environment, and which permits communicating using spread-spectrum modulation between a plurality of users.

OBJECTS OF THE INVENTION

An object of the invention is a system and method for synchronously demodulating a plurality of modulated-data signals received from a plurality of users and embedded in a received spread-spectrum-communications signal, which can serve as a conference calling receiver and which performs well whether or not the signal is fading.

Another object of the invention is synchronous, conference-calling, spread-spectrum-communications system.

SUMMARY OF THE INVENTION

According to the present invention, as embodied and broadly described herein, a spread-spectrum communications system for use over a communications channel is provided comprising a base station and a plurality of PCN units. Each base station is located within a cell, and has a spread-spectrum transmitter and a spread-spectrum receiver. Each PCN unit has a spread-spectrum transmitter and a spread-spectrum-conference calling receiver.

The present invention includes simultaneously receiving at the base station a spread-spectrum-communications signal having a plurality of spread-spectrum-processed signals. In this case, the receiver further includes a plurality of message-spread-spectrum-processing means, a plurality of detection means and a plurality of synchronous means. The acquisition and tracking means tracks the recovered-carrier signal for synchronizing the generic-spread-spectrum-processing means to the recovered-carrier signal. The plurality of message-spread-spectrum-processing means derives synchronization from the replica of the generic-chip-code signal, from the generic-spread-spectrum-processing means. The plurality of message-spread-spectrum-processing means despreads the spread-spectrum-communications signal as a plurality of modulated-data signals, respectively. The plurality of detection means may be synchronous or nonsynchronous, for converting the plurality of modulated-data signals to a plurality of detected signals. The plurality of synchronous means uses the replica of the generic-chip-code signal produced by the generic-spread-spectrum-processing means for synchronizing the detection of the plurality of detected signals to a plurality of received data.

The spread-spectrum transmitter at the base station includes generic means, a plurality of message means, a plurality of spreading means, summer means, and transmitter means. The generic means generates a generic-chip-code signal. The plurality of message means generates a plurality message-chip-code signals. A plurality of message data and a plurality of message-chip-code signals are synchronized to the generic-chip-code signal, or to a common clock signal. The plurality of message data is the plurality of received data, respectively, from the receiver at the base station. The plurality of spreading means spread-spectrum processes the plurality of message data with the plurality of message-chip-code signals, respectively, to generate a plurality of spread-spectrum-processed signals. The summer means combines the generic-chip-code signal and the plurality of spread-spectrum-processed signals.

The combined signal typically is a multi-level signal, with the instantaneously-combined voltage level equal to the sum of the voltage levels of the message-chip-code signal and the generic-chip-code signal. The combined signal need not be an exact linear combination of the voltage levels. The nonlinearity does not necessarily cause a significant degradation in performance, compared with a linear sum. A multi-level signal is a signal with multiple voltage levels.

The transmitter means transmits the combined generic-chip-code signal and plurality of spread-spectrumprocessed signal, on a carrier signal over the communications channel as a spread-spectrum-communications signal.

The plurality of PCN units are located in the cell. Each of the PCN units has a PCN antenna and PCN detection means. The PCN-detection means recovers data communicated from the PCN-base station. For communicating to the PCN-base station, the PCN unit has PCN-converting means, PCN-product-processing means and PCN-transmitting means. The PCN-converting means converts the format of a message signal or message data from a PCN user into a form suitable for communicating over radio waves. The message signal typically is an analog voice signal. The PCN-product-processing means processes the data with spread spectrum modulation. The PCN-transmitting means transmits the spread spectrum processed converted data from the PCN unit to a PCN-base station.

The spread-spectrum-conference-calling receiver at the PCN unit can be used for simultaneously receiving a plurality of spread-spectrum channels of a plurality of received spread-spectrum-communications signals. The plurality of received spread-spectrum-communications signals may originate from the foregoing spread-spectrum transmitter. The spread-spectrum transmitter sends a spread-spectrum-communications signal having a plurality of message data modulated as a plurality of spread-spectrum-processed signals, and combined with a respective generic-chip-code signal.

The spread-spectrum-conference-calling receiver at the PCN unit includes a plurality of spread-spectrum receivers, generic-spread-spectrum-processing means, acquisition and tracking means, and combiner means. Each spread-spectrum receiver has message-spread-spectrum-processing means and demodulating means.

The generic-spread-spectrum-processing means recovers a carrier signal from a spread-spectrum channel of a received pread-spectrum-communications signal transmitted by the spread-spectrum transmitter, and generates a replica of the generic-chip-code signal of the spread-spectrum channel. The acquisition and tracking means acquires and tracks the recovered carrier signal of the respective spread-spectrum channel. The acquisition and tracking means also synchronizes the generic-spread-spectrum-processing means to the respective recovered carrier signal.

Each of the message-spread-spectrum-processing means despreads the spread-spectrum-communications signal of the respective spread-spectrum channel as a modulated-data signal. Each detection means detects the modulated-data signal as a detected signal, respectively. The detection means may be nonsynchronous or synchronous, for converting the modulated-data signal to the detected signal.

Each bit-synchronization means uses the replica of the generic-chip-code signal produced by the generic-spread-spectrum-processing means for synchronizing the "integrating and dumping" of the detected signal. The plurality of "integrated and dumped" detected signals from the plurality of spread-spectrum receivers are referred to as a plurality of demodulated signals. The combiner means combines the plurality of demodulated signals from the plurality of bit-synchronization means, of the plurality of spread-spectrum receivers, as a received-message signal.

A second embodiment of the spread-spectrum-conference-calling receiver for simultaneously receiving a plurality of spread-spectrum channels includes generic-spread-spectrum-processing means, acquisition and tracking means, a plurality of spread-spectrum receivers, demodulation means, combiner means and switching means. Each of the plurality of spread-spectrum receivers has message-spread-spectrum-processing means. The generic-spread-spectrum-processing means generates a replica of a generic-chip-code signal. The generic-spread-spectrum-processing means uses the replica of the generic-chip-code signal for recovering a carrier signal from a respective spread-spectrum channel of the received spread-spectrum-communications signals. The acquisition and tracking means acquires and tracks the recovered carrier signal, and synchronizes the generic-spread-spectrum-processing means to the recover carrier signal.

Each of the message-spread-spectrum-processing means despreads the respective spread-spectrum channel of the spread-spectrum-communications signal as a modulated-data signal. Each of the message-spread-spectrum-processing means derives synchronization from a replica of the generic-chip-code signal provided by the generic-spread-spectrum-processing means.

A single demodulating means is employed for demodulating each modulated-data signal as a respective demodulated signal. The demodulation means includes detection means and bit-synchronization means. The demodulation means is used on a time-shared basis. Accordingly, the detection means sequentially detects each of the plurality of modulated-data signals from the plurality of message-spread-spectrum-processing means, as a detected signal, respectively. The detection means may be synchronous or nonsynchronous for converting each of the plurality of modulated-data signals to a detected signal.

Each of the detected signals is "integrated and dumped" by bit-synchronization means. The bit-synchronization means derives synchronization from a replica of the generic-chip-code signal produced by generic-spread-spectrum-processing means.

Switching means is coupled between an input of the demodulation means and each output of the message-spread-spectrum-processing means. The switching means also is coupled between the output of the demodulation means and a plurality of inputs of the combiner means. The switching means switches the demodulation means between each of the message-spread-spectrum-processing means and each input of the combiner means, respectively. A single demodulation means accordingly demodulates, by time sharing, each of the modulated-data signals as a respective demodulated signal, from each of the message-spread-spectrum-processing means. The combiner means, by time-sharing the demodulation means, combines each of the demodulated signals to generate the received-message signal.

The present invention also includes a method for conference calling spread-spectrum communications. The method comprises the steps of generating a generic-chip-code signal and a plurality of message-chip-code signals. The plurality of message data are modulo-2 added to the plurality of message-chip-code signals, respectively, to generate a plurality of spread-spectrum-processed signals. The generic-chip-code signal and the plurality of spread-spectrum-processed signals are combined and transmitted on a carrier signal over the communications channel as a spread-spectrum-communications signal.

At the receiver, the steps include recovering the carrier signal from the received spread-spectrum-communications signal, and despreading the plurality of received spread-spectrum communications signal as a plurality of modulated-data signals. The recovered-carrier signal is used to synchronize a step of generating a replica of the generic-chip-code signal at the transmitter.

A plurality of replicas of the message-chip-code signals is synchronized to the replica of the generic-chip-code signal for despreading the received spread-spectrum-communications signals as a plurality of modulated-data signals, respectively. The plurality of modulated-data signals is detected as a plurality of detected signals, respectively. The recovered-carrier signal optionally may be used to synchronously demodulate the plurality of modulated-data signals as the plurality of detected signals. Each of the detected signals is synchronously converted to a demodulated signal, by using timing from the replica of the generic-chip-code signal to control "integrating and dumping" functions of a lowpass filter and electronic switch. The plurality of demodulated signals is combined to generate the received-message signal.

Additional objects and advantages of the invention are set forth in part in the description which follows, and in part are obvious from the description, or may be learned by practice of the invention. The objects and advantages of the invention also may be realized and attained by means of the instrumentalities and combinations particularly pointed out in the appended claims.

BRIEF DESCRIPTION OF THE DRAWINGS

The accompanying drawings, which are incorporated in and constitute a part of the specification, illustrate preferred embodiments of the invention, and together with the description serve to explain the principles of the invention.

FIG. 2 is a diagram of a spread-spectrum cellular environment;

FIG. 3 is a system concept of a plurality of PCN units communicating through a base station;

FIG. 4 is a system concept of a PCN unit demodulating a plurality of spread-spectrum signals;

FIG. 5 is a block diagram of a PCN unit's spread-spectrum transmitter;

FIG. 11 is a flow chart of the method according to the present invention.

DETAILED DESCRIPTION OF THE PREFERRED EMBODIMENTS

Figure 1:
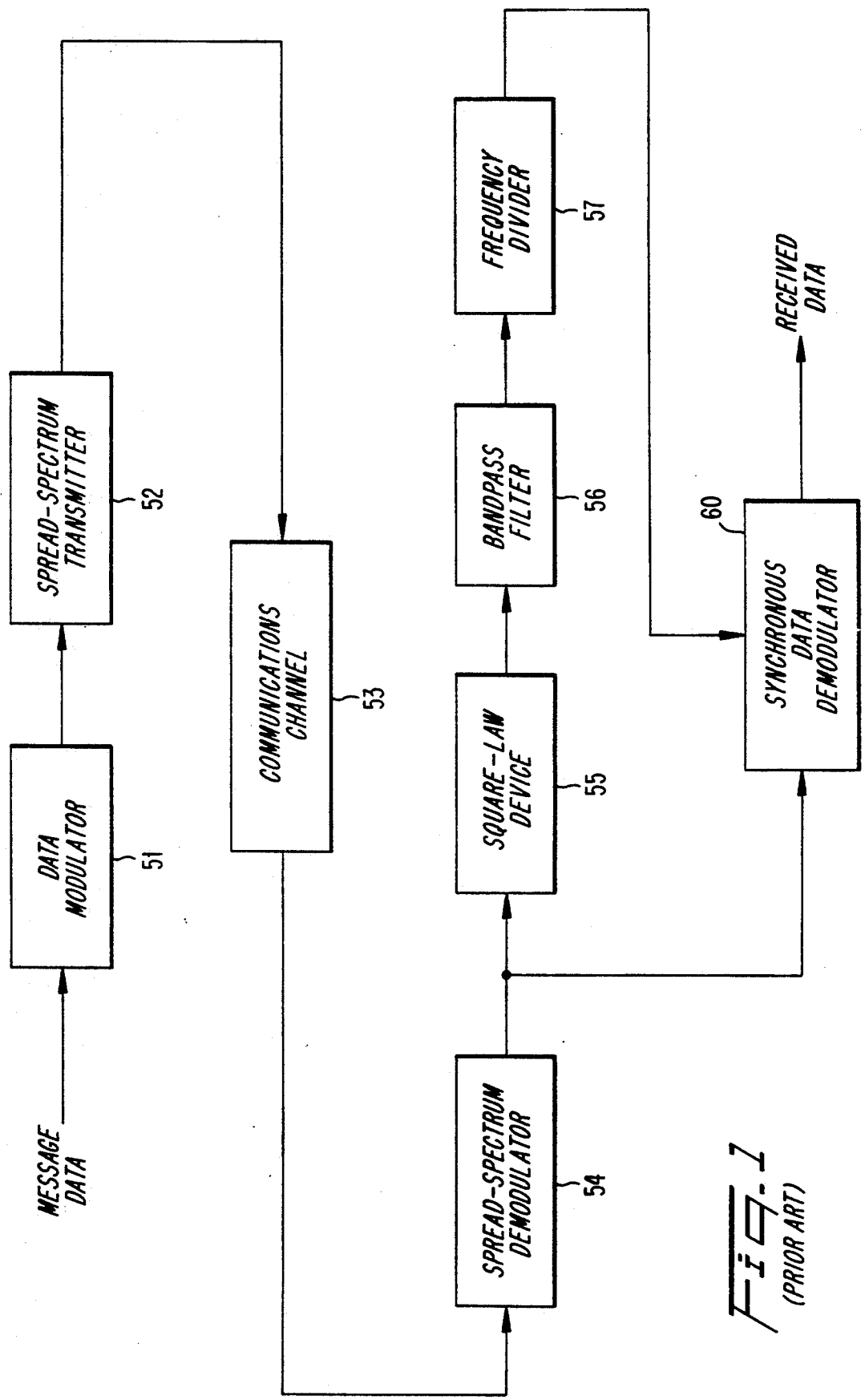
FIG. 1 is a prior art scheme for synchronously recovering message data.

Reference will now be made in detail to the present preferred embodiments of the invention, examples of which are illustrated in the accompanying drawings, wherein like reference numerals indicate like elements throughout the several views.

The following disclosure first discusses a PCN unit transmitter, a base station receiver and transmitter, then the two embodiments of a PCN unit, spread-spectrum-conference-calling receiver. Broadly, this disclosure teaches apparatus and method for conference calling message data, from a spread-spectrum transmitter which transmits a plurality of spread-spectrum channels.

The arrangement disclosed in this specification has particular use for conference calling a plurality of PCN units, such as a plurality of mobile radiotelephone units, in a single cell of a cellular infrastructure of a spread-spectrum-CDMA-communications system. More particularly, the arrangement disclosed herein is directed to efficient conference calling system.

The present invention is illustrated, by way of example, with a plurality of PCN units in a first cell which has a first base station. The first cell is assumed to be surrounded by N—1 cells. Each of the base stations in these N—1 cells transmits a spread-spectrum-communications signal using a generic-chip-code signal which is different from the other cells and the first cell. All cells transmit the spread-spectrum communication signal at the same carrier frequency. The PCN unit scans the N—1 generic-chip-code signals of the neighboring cells.

FIG. 2 illustrates a unique cellular spread-spectrum-CDMA-communications system which, in simplified form, includes a first base station 124 and a second base station 126 for two geographic spread-spectrum-CDMA communications areas (cells) 112, 114, respectively. In a preferred embodiment six cells are adjacent to a given cell, as shown for the second cell 114. Each cell adjacent to the given cell, i.e. the second cell 114, uses a different chip codeword from the second cell 114 and from each other. This permits reuse of chip codewords.

The first base station 124 communicates with a first plurality of PCN units 135, and the second base station communicates with a second plurality of PCN units 235. For the conference call, a multiplicity of PCN units in the first cell, which is a subset of the plurality of PCN units 135 in the first cell 112, desire to have a conference call.

FIG. 3 is a system concept of the multiplicity of PCN units 31, 32, 39 communicating through a base station 35, with each PCN unit transmitting a spread-spectrum signal which includes message data spread-spectrum modulated with a message-chip-code signal and combined with a generic-chip-code signal, respectively. The base station 35 receives the spread-spretrum signals from the multiplicity of PCN units 31, 32, 39, demodulates each spread-spectrum signal as a multiplicity of message data. The spread-spectrum transmitter at the base station 35 modulates the multiplicity of message data with a multiplicity of message-chip-code signals, combines the spread-spectrum-modulated message data and a generic-chip-code signal. the combined signal is retransmitted on a carrier frequency to the multiplicity of PCN units 31, 32, 39.

FIG. 4 is a system concept of a PCN unit demodulating the multiplicity of spread-spectrum signals. The PCN unit 37 outputs the received multiplicity of message data originally transmitted from the multiplicity of PCN units.

PCN UNIT TRANSMITTER

Figure 7:
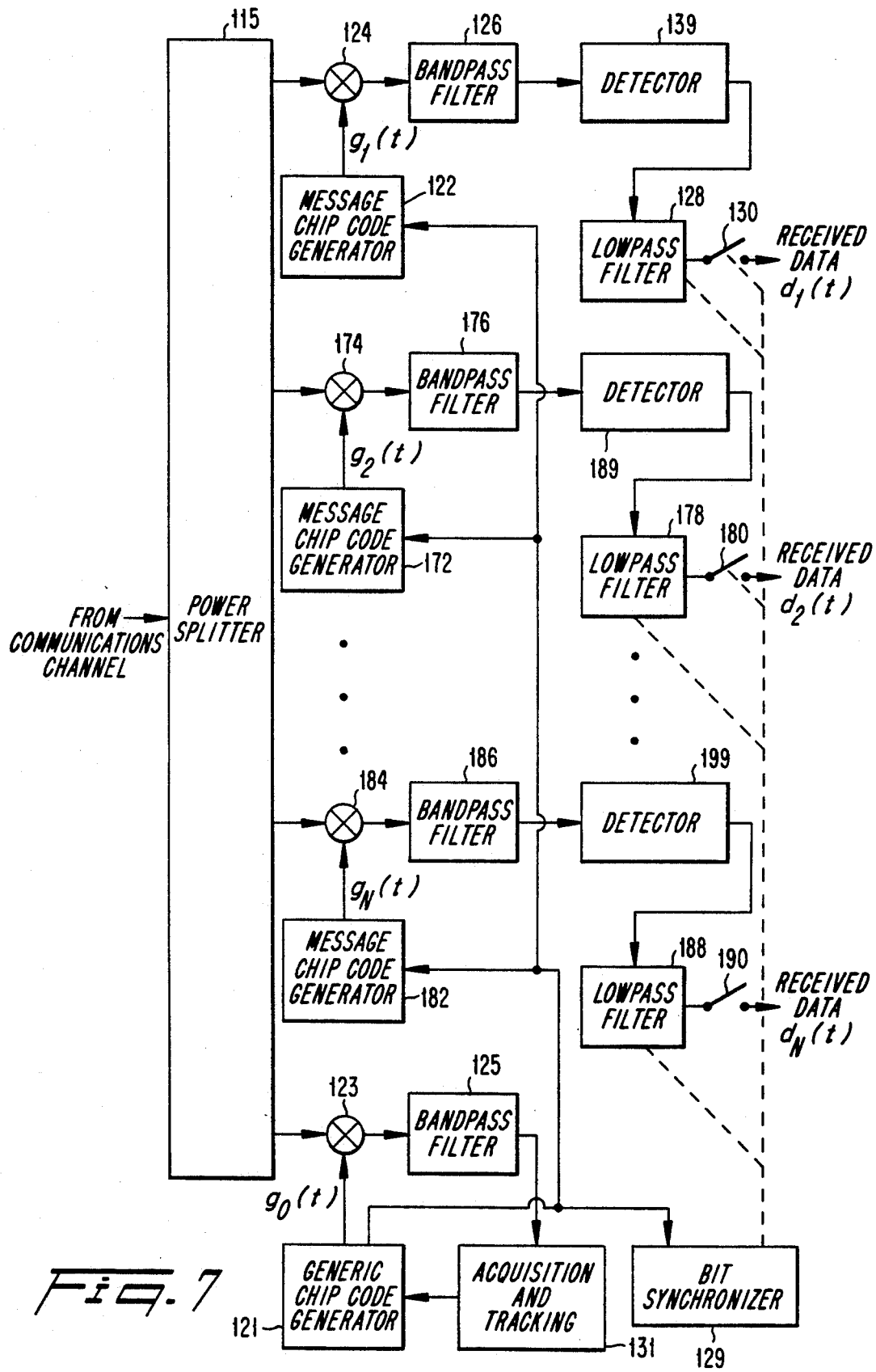
FIG. 7 shows a spread-spectrum receiver using a nonsynchronous detector for receiving a plurality of spread-spectrum processed signals.

FIG. 5 is a block diagram of a PCN unit's spread-spectrum transmitter. The PCN-converting means, as illustrated in FIG. 7, may be embodied as a PCN modulator 171. The PCN modulator 171 converts the format of the data into a form suitable for communicating over radio waves. Similar to the PCN-base station, an analog voice signal may be converted to a converted-data signal. The converted-data signal may be source encoded, and modulated by a PCN-carrier signal using BPSK.

The PCN-spread-spectrum-processing means may be embodied as a PCN-spread-spectrum modulator 173. The PCN-spread-spectrum modulator 173 is coupled to the PCN modulator 171. The PCN-spread-spectrum modulator 173 modulates the converted-data signal with a selected chip code, $g_i(t)$. This entails multiplying, or modulo adding with an EXCLUSIVE-OR gate, the converted data by a chip code, $g_i(t)$.

The PCN-transmitting means may be embodied as a PCN transmitter 175. The PCN transmitter 175 is coupled between the PCN-spread-spectrum modulator 173 and antenna 179. The PCN transmitter 175 transmits the spread-spectrum-processed-converted data from the PCN unit to the PCN-base station. The PCN transmitter 175 modulates the spread-spectrum-processed-converted data at a carrier frequency, $f_o$. The carrier frequency of the PCN transmitter and the base station transmitter may be at the same or at different frequencies.

A key to the present invention is that the spread spectrum signals are designed to be "transparent" to other users, i.e., spread spectrum signals are designed to provide negligible interference to the communication of other, existing users. The presence of a spread spectrum signal is difficult to determine. This characteristic is known as low probability of interception (LPI) and low probability of detection (LPD). The LPI and LPD features of spread spectrum allow transmission between users of a spread spectrum CDMA communications system without the existing users of the mobile cellular system experiencing significant interference. The present invention makes use of LPI and LPD with respect to the predetermined channels using FM in a mobile cellular system. By having the power level of each spread spectrum signal below the predetermined level, then the total power from all spread spectrum used within a cell does not interfere with users in the mobile cellular system.

BASE STATION RECEIVER

Figure 6:
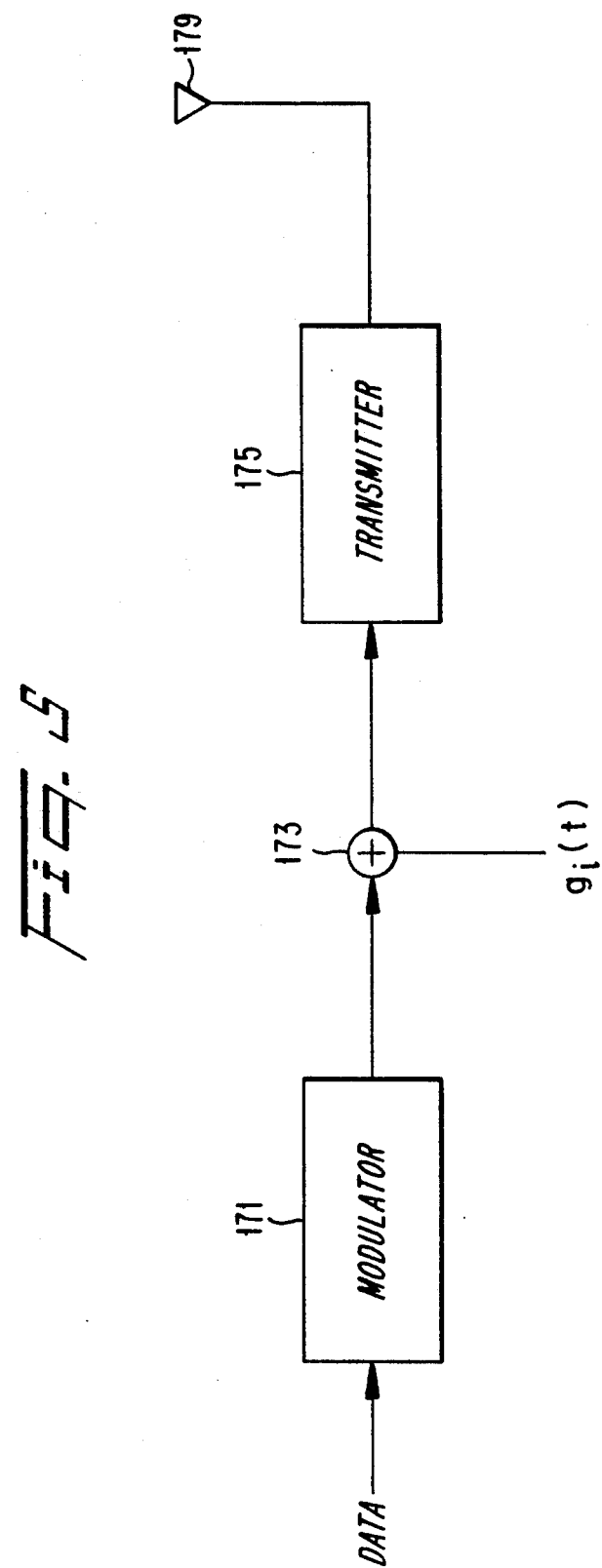
FIG. 6 shows a spread-spectrum receiver using a synchronous detector for receiving a plurality of spread-spectrum processed signals.
Figure 6:
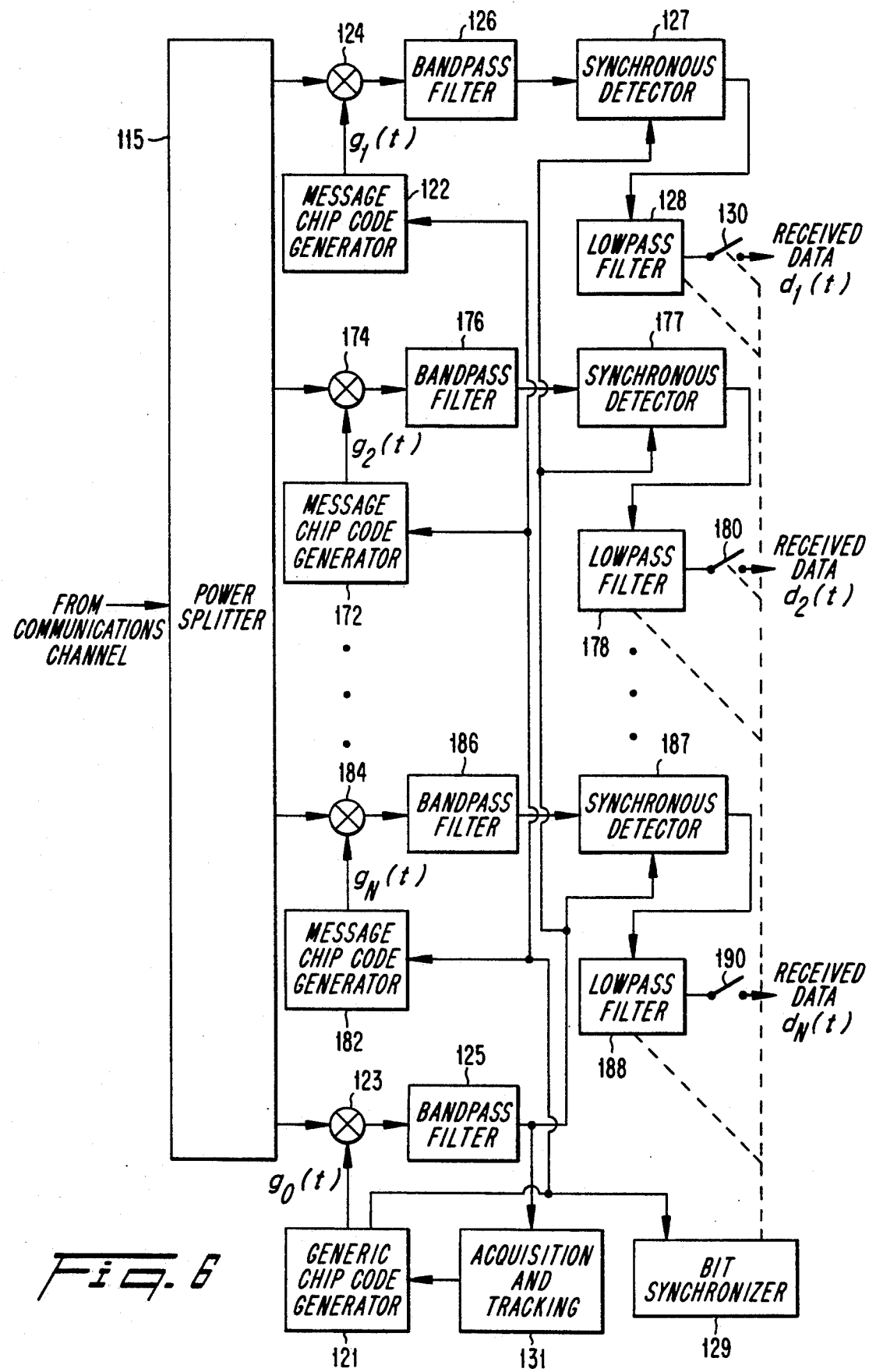

The present invention includes receiving, at the base station, a spread-spectrum-communications signal which has a plurality of spread-spectrum-processed signals. The receiver at the base station further includes a plurality of message-spread-spectrum processing means, a plurality of detection means and a plurality of synchronous means. The plurality message-spread-spectrum-processing means, as shown in FIG. 6, may be embodied as a plurality of message-chip-code generators, a plurality of message mixers and a plurality of message-bandpass filters. A mixer is connected between a respective message-chip-code generator and message-bandpass filter. The plurality of message mixers is coupled to the power splitter 115. More particularly, the plurality of message-chip-code generators is shown embodied as first message-chip-code generator 122, second message-chip-code generator 172, through $N^{th}$ message-chip-code generator 182. The plurality of message mixers is shown as first message mixer 124, second message mixer 174 through $N^{th}$ message mixer 184. The plurality of message-bandpass filters is shown as first message-bandpass filter 126, second message-bandpass filter 176, through $N^{th}$ message-bandpass filter 186.

The plurality of detection means may be embodied as a plurality of synchronous detectors which is shown as first synchronous detector 127, second synchronous detector 177 through $N^{th}$ synchronous detector 187. Each of the plurality of synchronous detectors are coupled to one of the plurality message-bandpass filters.

The plurality of synchronous means may include a bit synchronizer 129, a plurality of lowpass filters and a plurality of electronic switches. The plurality of lowpass filters is shown as first lowpass filter 128, second lowpass filter 178, through $N^{th}$ lowpass filter 188. The plurality of electronic switches is shown as first electronic switch 130, second electronic switch 180 through $N^{th}$ electronic switch 190. Each of the plurality of synchronous detectors is coupled to an output of the generic-bandpass filter 125. The recovered-carrier signal from the generic-bandpass filter 125 serves as the reference signal for synchronously demodulating each of the plurality of message-data signals by the plurality of synchronous detectors, as a plurality of received data, $d_1(t), d_2(t), , , d_N(t)$.

The detection means alternatively may be embodied as a plurality of nonsynchronous detectors, such as envelope detectors 139, 189, 199, as shown in FIG. 7. Typically, the nonsynchronous detectors do not require the recovered-carrier signal.

The bit synchronizer 129 derives timing from the replica of the generic-chip-code signal, $g_0(t)$, and controls the timing of the integrating and dumping functions of the plurality lowpass filters and the plurality of electronic switches.

With the use of the invention as embodied in FIG. 6, a generic-spread-spectrum channel, as part of the spread-spectrum-communications signal, provides the recovered-carrier signal, as discussed previously. The acquisition and tracking circuit 131 acquires and tracks the recovered-carrier signal from an output of the generic-bandpass filter 125. The replica of the generic-chip-code signal from the receiver-generic-chip-code generator 121 is synchronized to the recovered-carrier signal via acquisition and tracking circuit 131. The receiver-generic-chip-code generator 121 generates a replica of the generates a replica of the generic-chip-code signal, $g_0(t)$, which provides timing to bit synchronizer 129 and to the plurality of receiver-message-chip-code generators 122, 172, 182.

BASE STATION TRANSMITTER

Figure 8:
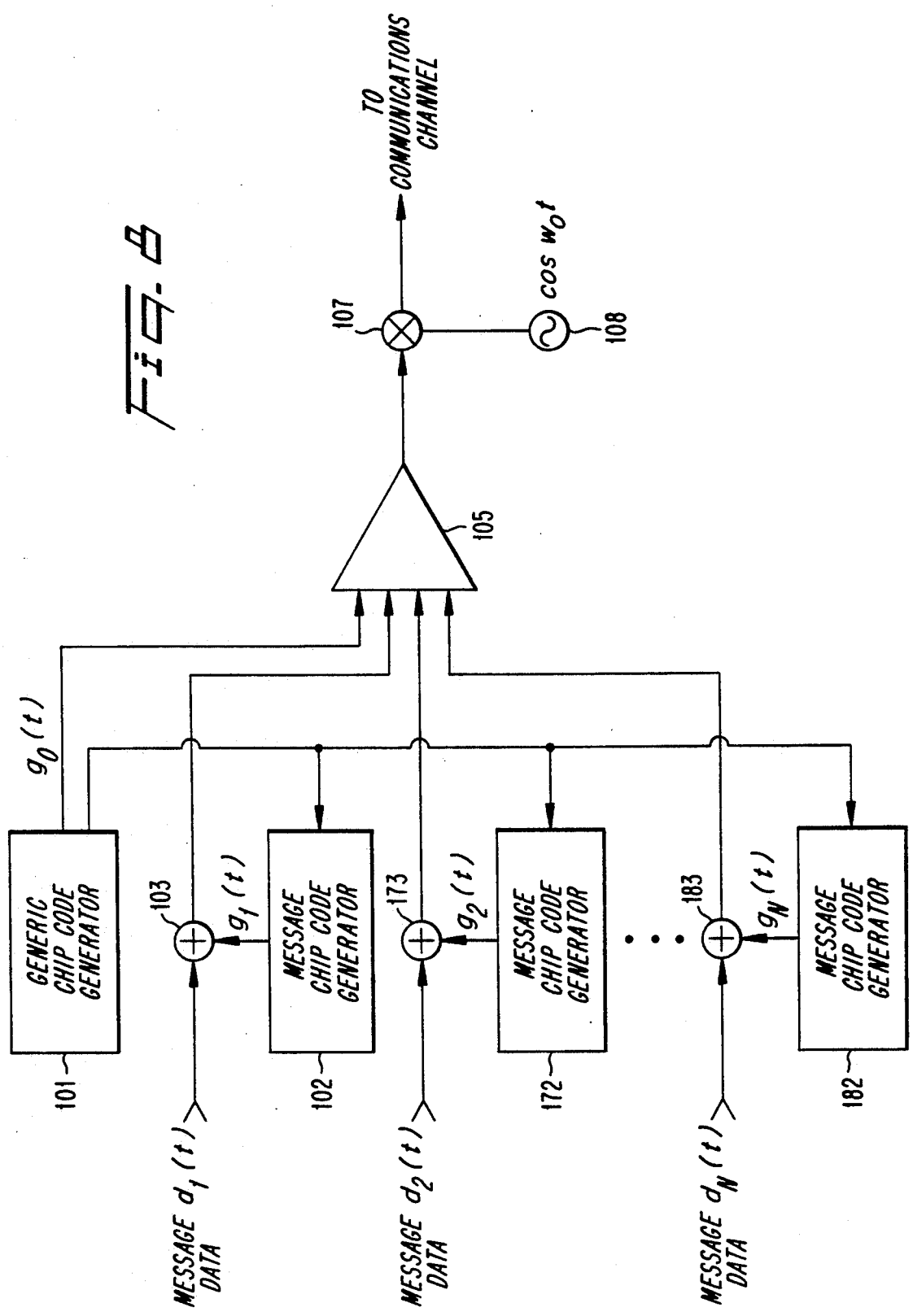
FIG. 8 shows a synchronous spread-spectrum transmitter system for a plurality of message data.

The present invention includes transmitting, from the base station, as the spread-spectrum-communications signal, a plurality of spread-spectrum-processed signals for handling a plurality of message data. The plurality of message data are the plurality of received data, respectively, that were received at the base station. In this case the invention includes a plurality of message means and a plurality of spreading means. Referring to FIG. 8, the plurality of message means may be embodied as a plurality of transmitter-message-chip-code generators and the plurality of spreading means may be embodied as a plurality of EXCLUSIVE-OR gates. The plurality of transmitter-message-chip-code generators generates a plurality of message-chip-code signals. In FIG. 8, the plurality of transmitter-message-chip-code generators is shown as first transmitter-message-chip-code generator 102 generating first message-chip-code signal, $g_1(t)$, second transmitter-message-chip-code generator 172 generating second message-chip-code signal, $g_2(t)$, through $N^{th}$ transmitter-message-chip-code generator 182 generating $N^{th}$ message-chip-code signal, $g_N(t)$. The plurality of EXCLUSIVE-OR gates is shown as first EXCLUSIVE-OR gate 103, second EXCLUSIVE-OR gate 173, through $N^{th}$ EXCLUSIVE-OR gate 183. The plurality of EXCLUSIVE-OR gates generates a plurality of spread-spectrum-processed signals by modulo-2 adding the plurality of message data $d_1(t), d_2(t), \ldots, d_N(t)$ with the plurality of message-chip-code signals $g_1(t), g_2(t), \ldots, g_N(t)$, respectively. More particularly, the first message data, $d_1(t)$, are modulo-2 added with the first message-chip-code signal, $g_1(t)$, the second message data, $d_2(t)$, are modulo-2 added with the second message-chip-code signal, $g_2(t)$, through the $N^{th}$ message data, $d_N(t)$, which are modulo-2 added with the $N^{th}$ message-chip-code signal, $g_N(t)$.

The transmitter-generic-chip-code generator 101 is coupled to the plurality of transmitter-message-chip-code generators and the source for the plurality of message data, $d_1(t), d_2(t), \ldots d_N(t)$. The generic-chip-code signal $g_0(t)$, in a preferred embodiment, provides synchronous timing for the plurality of message-chip-code signals $g_1(t), g_2(t), \ldots, g_N(t)$, and the plurality of message data $d_1(t), d_2(t), \ldots, d_N(t)$. Alternatively, the plurality of message data and the plurality of message-chip-code signals may be synchronized to a common clock signal.

The combiner 105 combines the generic-chip-code signal and the plurality of spread-spectrum-processed signals, by linearly adding the generic-chip-code signal with the plurality of spread-spectrum-processed signals. The combined signal typically is a multilevel signal, which has the instantaneous voltage levels of the generic-chip-code signal and the plurality of spread-spectrum-processed signals. The combined signal need not be an exact linear combination of voltage levels. The nonlinearity does not necessarily cause a significant degradation in performance, compared with a linear sum. A multi-level signal is a signal with multiple voltage levels.

The modulator 107, as part of the transmitter, modulates the combined generic-chip-code signal and the plurality of spread-spectrum-processed signals by a carrier signal, $\cos w_0 t$, at a carrier frequency, $f_0$. The modulated generic-chip-code signal and the plurality of spread-spectrum processed signals are transmitted over the communications channel 110 as a spread-spectrum-communications signal, $x_c(t)$. The spread-spectrum-communications signal, $x_c(t)$ has the form:

$$x_c(t) = \left\{ g_0(t) + \sum_{i=1}^{N} [g_i(t) + d_i(t)] \right\} \cos w_0 t$$

Thus, the spread-spectrum-communications signal includes the generic-chip-code signal and the plurality of spread-spectrum-processed signals as if they were each modulated separately, and synchronously, on separate carrier signals with the same carrier frequency, $f_0$, and transmitted over the communications channel.

PCN UNIT RECEIVER

The spread-spectrum-conference-calling receiver, at the PCN unit, can be used for simultaneously receiving a plurality of spread-spectrum channels of a received spread-spectrum-communications signal. The received spread-spectrum-communications signal typically originates from a spread-spectrum transmitter at the base station. The plurality of message data may come from a plurality of telephone lines, or have been received at a base station by a plurality of spread-spectrum receivers. Thus, the spread-spectrum channels may originate from message data converted to a spread-spectrum-processed signal by a base station transmitter.

A first implementation of the spread-spectrum-conference-calling receiver includes a plurality of spread-spectrum receivers, generic-spread-spectrum-processing means, acquisition and tracking means, and combiner means. Each of the spread-spectrum receivers includes message-spread-spectrum-processing means and demodulation means.

The generic-spread-spectrum-processing means recovers a carrier signal from a generic-spread-spectrum channel of a received spread-spectrum-communications signal. The generic-spread-spectrum channel has the generic-chip-code signal which was combined with spread-spectrum-processed signal at the spread-spectrum transmitter. The acquisition and tracking means synchronizes the generic-spread-spectrum-processing means to the recovered carrier signal.

Figure 9:
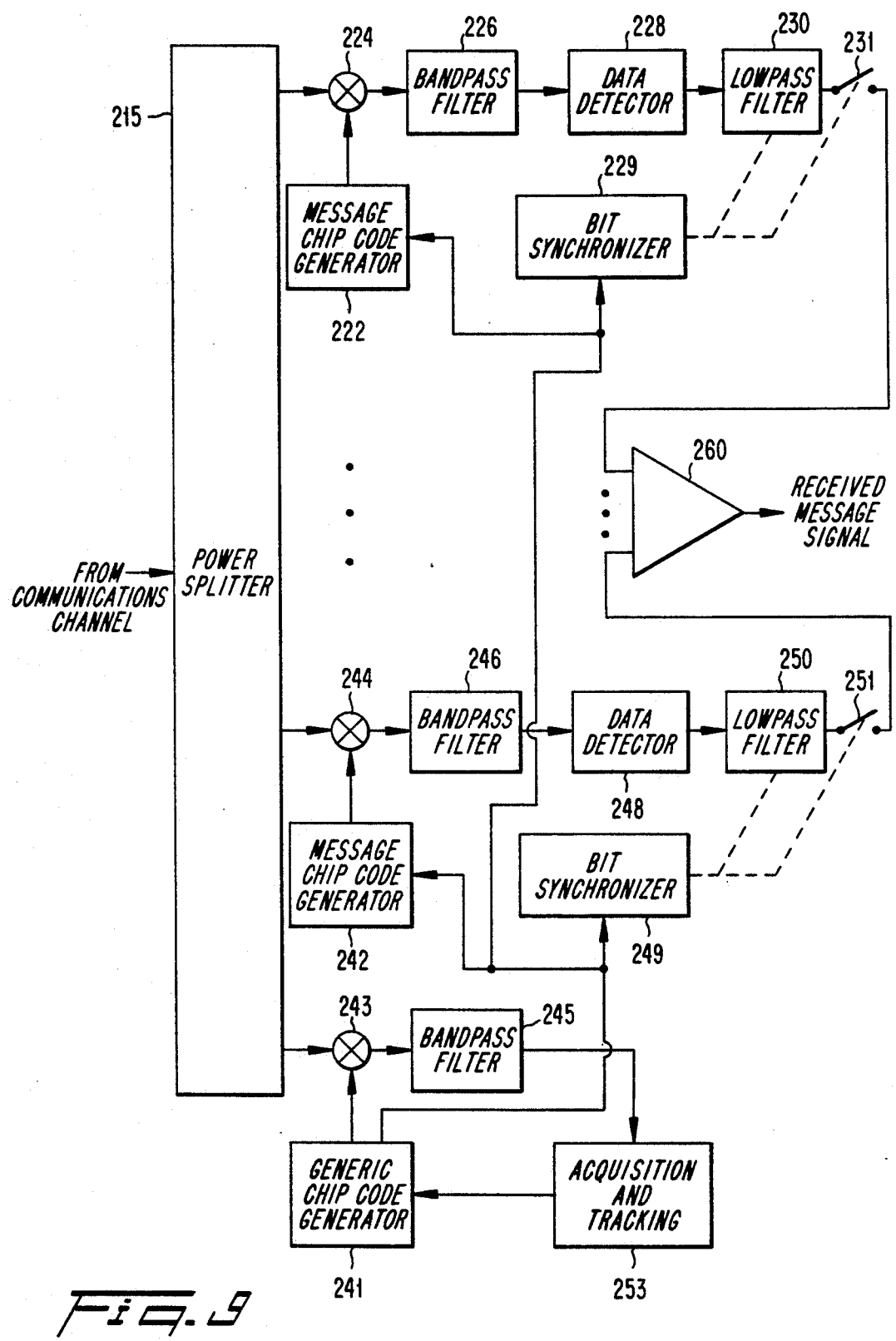
FIG. 9 is a block diagram of a spread-spectrum receiver for conference call.

As illustratively shown in FIG. 9, generic-spread-spectrum-processing means is embodied as a receiver-generic-chip-code generator 241, a generic mixer 243, and a generic-bandpass filter 245, and an acquisition and tracking means is embodied as an acquisition and tracking circuit 253. For the generic-spread-spectrum-processing means shown in FIG. 9, a generic mixer is coupled between a generic-bandpass filter and a receiver-generic-chip-code generator. The acquisition and tracking circuit is coupled to an output of a generic-bandpass filter and to a generic-chip-code generator.

With the use of the invention as embodied in FIG. 9, a generic-spread-spectrum channel, as part of the spread-spectrum-communications signal, provides a recovered-carrier signal. Looking at the block diagram of the acquisition and tracking means and generic spread-spectrum-processing means of FIG. 9, the acquisition and tracking circuit 253 acquires and tracks the recovered-carrier signal from an output of the generic-bandpass filter 245. The replica of the generic-chip-code signal from the receiver-generic-chip-code generator 241 is synchronized to the recovered-carrier signal via acquisition and tracking circuit 253. The receiver-generic-chip-code generator 241 generates a replica of the generates a replica of the generic-chip-code signal, $g_0(t)$, which provides timing to first bit synchronizer 229 through $n^{th}$ bit synchronizer 249, and to the corresponding first receiver-message-chip-code generator 222, through the $n^{th}$ receiver-message-chip-code generator 242 and $n^{th}$ bit synchronizer 249.

If the signal out of the generic-bandpass filter is small, then the acquisition and tracking circuit delays the phase of the generic-chip-code signal and the correlation process is repeated. If the phase of the replica of the generic-chip-code signal and the generic-chip-code signal in the spread-spectrum-communications signal are the same, then the output of the generic-bandpass filter will be at a high voltage level.

Each spread-spectrum receiver has message-spread-spectrum-processing means for despreading a spread-spectrum channel of the received spread-spectrum-communications signal, as a modulated-data signal. The message-spread-spectrum processing means derives synchronization from a replica of the generic-chip-code signal, or other synchronization signal, provided by the generic-spread-spectrum-processing means.

The first message-spread-spectrum-processing means of a first spread-spectrum receiver, as shown in FIG. 9, may be embodied as a first receiver message-chip-code generator 222, a first message mixer 224 and a first message-bandpass filter 226. The first message mixer 224 is connected between the first message-chip-code generator 222 and the first message-bandpass filter 226. The $N^{th}$ message-spread-spectrum-processing means is illustrated as the $N^{th}$ receiver-message-chip-code generator 242, the $N^{th}$ message mixer 244 and the $N^{th}$ message-bandpass filter 248. For each spread-spectrum receiver, a message mixer is coupled between a receiver-message-chip-code generator and a message-bandpass filter, respectively. The plurality of message mixers is coupled to the power splitter 215.

Each of the message-chip-code generators of a respective spread-spectrum receiver generates a replica of a message-chip-code signal, i.e. the chip codeword used to modulate the message data, for the spread-spectrum channel of the received spread-spectrum-communications signal being received from a respective spread-spectrum transmitter. Thus, a spread-spectrum receiver uses the same chip codeword as used at a respective spread-spectrum transmitter or spread-spectrum channel of a spread-spectrum transmitter.

For each spread-spectrum receiver, a message mixer mixes a received spread-spectrum-communications signal with the replica of the message-chip-code signal to generate a modulated-data signal. The modulated-data signal is a modulated version of message data on a carrier signal, without spread-spectrum modulation. A message-bandpass filter filters the modulated-data signal.

Each spread-spectrum receiver has demodulation means for demodulating a modulated-data signal as a demodulated signal. The demodulation means includes detection means and bit-synchronization means. The detection means detects the modulated-data signal as a detected signal. The detection means may be synchronous or nonsynchronous, for converting a modulated-data signal to a detected signal. In the illustrative example of FIG. 9, the detection means is embodied as a data detector. More particularly, the first spread-spectrum receiver is shown with a first data detector 228, which is coupled to the first bandpass filter 226, and the $N^{th}$ spread-spectrum receiver is shown with an $N^{th}$ data detector 248, which is coupled to the $N^{th}$ bandpass filter 246. If a data detector uses synchronous detection, then a recovered-carrier signal from the generic-bandpass filter can serve as the reference signal for synchronously detecting the respective message-data signal as a detected signal. If the data detector uses nonsynchronous detection, as encountered with an envelope detector, then the recovered-carrier signal is not required. Each of the plurality of data detectors are coupled to one of the plurality message-bandpass filters, respectively.

The plurality of bit-synchronization means may be embodied as a plurality of bit synchronizers, a plurality of lowpass filters and a plurality of electronic switches, respectively. The plurality of bit synchronizers is shown as first bit synchronizer 229 through $N^{th}$ bit synchrinizer 249. The plurality of lowpass filters is shown as first lowpass filter 230, through $N^{th}$ lowpass filter 250. The plurality of electronic switches is shown as first electronic switch 231, through $N^{th}$ electronic switch 251.

Each of the plurality of bit synchronizers is coupled to the output of the generic-bandpass filter. The recovered-carrier signal from the generic-bandpass filter also serves as the reference signal for synchronously demodulating each of the plurality of modulated-data signals by the plurality of synchronous detectors, as a plurality of demodulated signals, $d_{R1}(t), d_{R2}(t), \ldots, d_{RN}(t)$.

Each of the bit synchronizers of the plurality of spread-spectrum receivers uses a replica of the generic-chip-code signal or other synchronization signal produced by the generic-chip-code generator. The generic-chip-code signal synchronizes the "integrating and dumping" of the detected signal. The "integrated and dumped" detected signal is referred to as a demodulated signal.

The plurality of bit synchronizers derive timing from the replica of the generic-chip-code signal, and the timing of the integrating and dumping functions of the plurality lowpass filters and the plurality of electronic switches.

The combiner means is shown in FIG. 9 as a combiner 260. The outputs from each of the electronic switches is coupled to an input of a combiner 260. The combiner 260 combines the plurality of demodulated signals as a received-message signal. Each of the plurality of demodulated signals is an analog signal, and the received-message signal is an analog signal.

A second embodiment of the spread-spectrum-conference-calling receiver for simultaneously receiving a plurality of spread-spectrum channels includes a plurality of spread-spectrum receivers, generic-spread-spectrum-processing means, acquisition and tracking means demodulation means, combiner means and switching means. Each of the plurality of spread-spectrum receivers has message-spread-spectrum-processing means. The generic-spread-spectrum-processing means generates a replica of the generic-chip-code signal. The generic-spread-spectrum-processing means uses the replica of the generic-chip-code signal for recovering a carrier signal from a respective spread-spectrum channel of a received spread-spectrum-communications signal.

Figure 10:
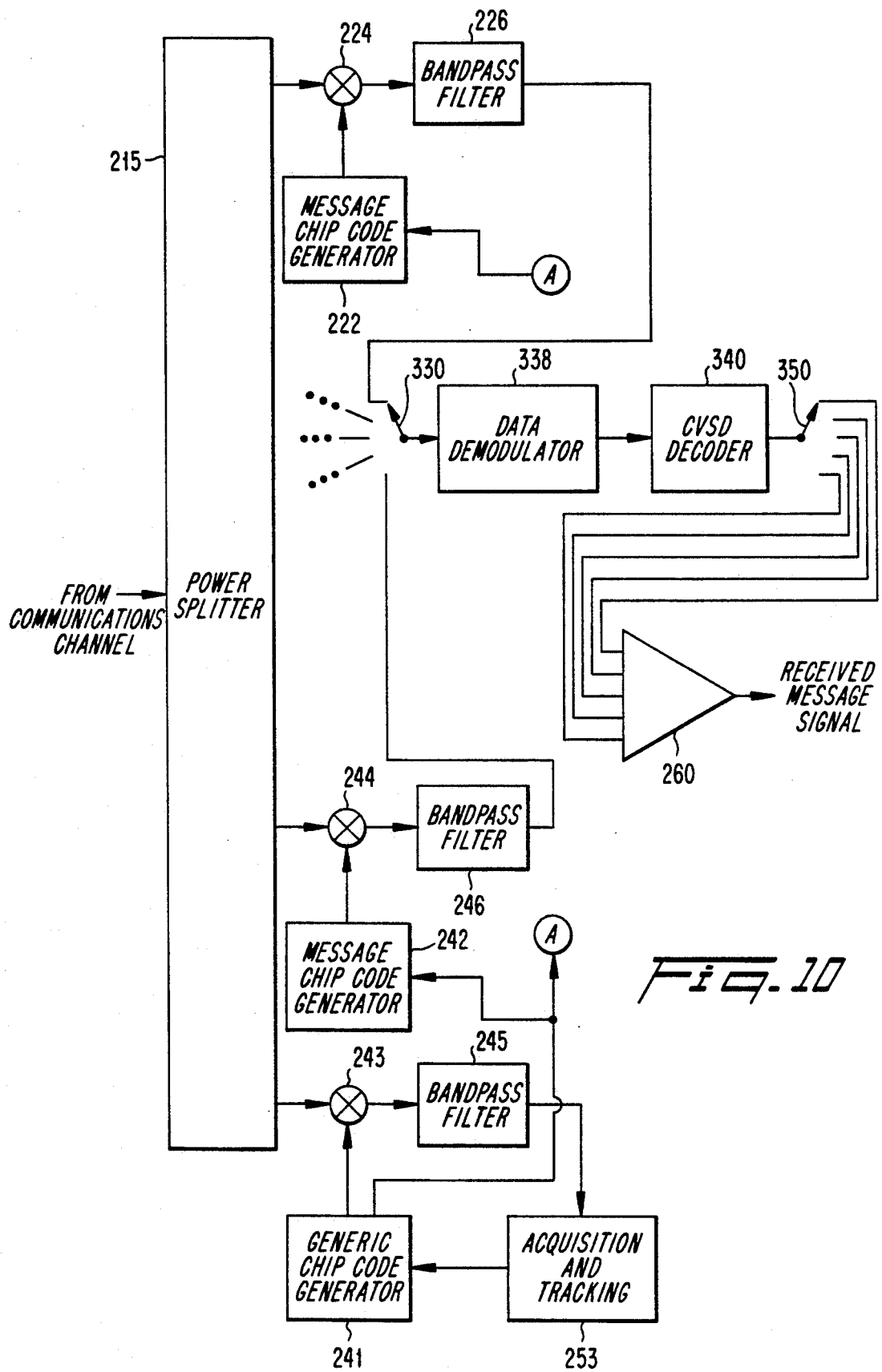
FIG. 10 is a block diagram of a spread-spectrum receiver with time multiplexing a data demodulator and decoder for conference call.

In FIG. 10, the generic-spread-spectrum-processing means is embodied as a receiver-generic-chip-code generator 241, a generic mixer 243, and a generic-bandpass filter 245, and an acquisition and tracking means is embodied as an acquisition and tracking circuit 253. For each generic-spread-spectrum-processing means embodied in FIG. 10, the generic mixer 243 is coupled between a generic-bandpass filter 245 and a receiver-generic-chip-code generator 241. The acquisition and tracking circuit 253 is coupled to an output of a generic-bandpass filter 245.

As with the circuits shown in FIG. 9, the generic-spread-spectrum channel provides a recovered-carrier signal. Also, if the signal out of the generic-bandpass filter is small, then the acquisition and tracking circuit delays the phase of the generic-chip-code signal and the correlation process is repeated. If the phase of the replica of the generic-chip-code signal and the generic-chip-code signal in the spread-spectrum-communications signal are the same, then the output of the generic-bandpass filter will be at a high voltage level.

The message-spread-spectrum-processing means of each spread-spectrum receiver despreads the respective spread-spectrum channel of the plurality of received spread-spectrum-communications signals as a modulated-data signal. Each message-spread-spectrum-processing means derives synchronization from a replica of the generic-chip-code signal, or other synchronization signal, provided by the generic-spread-spectrum-processing means.

The first message-spread-spectrum-processing means, as shown in FIG. 10, may be embodied as a first receiver-message-chip-code generator 222, a first message mixer 224 and a first message-bandpass filter 226. The first message mixer 224 is connected between the first message-chip-code generator 222 and the first message-bandpass filter 226. The $N^{th}$ message-spread-spectrum-processing means is illustrated as the $N^{th}$ receiver-message-chip-code generator 242, the $N^{th}$ message mixer 244, and the $N^{th}$ message-bandpass filter 248. For each spread-spectrum receiver, a message mixer is connected between a receiver-message-chip-code generator and a message-bandpass filter, respectively. The plurality of message mixers of the plurality of spread-spectrum receivers is connected to the power splitter 215.

The plurality of message mixers generate replicas of the plurality of message-chip-code signals, $g_1(t)$, $g_2(t)$, . . . , $g_n(t)$, which were used by the plurality of spread-spectrum transmitters, respectively. The plurality of message mixers mix the received spread-spectrum-communications signal with the replicas of the plurality of message-chip-code signals to generate the plurality of modulated-data signals, respectively. The plurality of message-bandpass filters filter the plurality of modulated-data signals, respectively.

A single demodulating means is employed for demodulating each modulated-data signal, from a message-bandpass filter, as a respective demodulated signal. Switching means is coupled between an input of the demodulation means and each output of each of the message-spread-spectrum-processing means. The switching means also is coupled between the output of the demodulation means and a plurality of inputs of the combiner means. The switching means switches the demodulation means between each of the message-spread-spectrum-processing means and each input of the combiner means, respectively. A single demodulation means accordingly demodulates, by time sharing, each of the modulated-data signals as a respective demodulated signal, from each of the message-spread-spectrum-processing means. The combiner means, by time-sharing the demodulation means, combines each of the demodulated signals from the demodulation means. If required, the switching means also switches the demodulation means between each of the generic-spread-spectrum-processing means, for appropriate timing and synchronization.

The demodulation means includes detection means and bit-synchronization means. In FIG. 10, the detection means is embodied as a data demodulator 338. The data demodulator 338 may be a nonsynchronous detector such as an envelope detector or square-law detector. Alternatively, the data demodulator 338 may be a synchronous detector, which uses a recovered-carrier signal from the generic-bandpass filter 245.

The bit-synchronization means includes a lowpass filter and an electronic switch, and a bit synchronizer.

The lowpass filter and electronic switch are coupled to the bit synchronizer, similar to the first bit-synchronization means shown in FIG. 9. The bit synchronizer preferably is coupled through an input electronic switch, to the plurality of receiver-generic-chip-code generators of the plurality of spread-spectrum receivers. Alternatively, the bit synchronizer may be coupled to an output of the data detector.

The switching means is shown as input-electronic switch 330 and output-electronic switch 350. The input-electronic switch 330 and the output-electronic switch 350 are synchronized to switch the data demodulator 338 between respective message-bandpass filters and inputs to the combiner 260. Synchronization of the input-electronic switch 330 and the output-electronic switch 350 can be provided through a command channel of the received spread-spectrum communications signal, or self-synchronized between respective channels from the spread-spectrum receivers. Appropriate buffers are included for this synchronization.

The combiner means, by time-sharing the demodulation means, combines each of the demodulated signals from the demodulation means to generate the received-message signal. The demodulated signals preferably are analog signals; and thus, the combiner means is preferably an analog combiner. In FIG. 10, the combiner means is embodied as a combiner 260.

In use, the spread-spectrum transmitter transmits a plurality of message data, $d_1(t)$, $d_2(t)$, . . . , $d_N(t)$. For the first message data, $d_1(t)$, as an example, the first transmitter-generic-chip-code generator 101 generates a first generic-chip-code signal, $g_0(t)$, and the transmitter-message-chip-code generator 102 generates a first message-chip-code signal $g_1(t)$. Similarly, for the second message data, $d_2(t)$, the transmitter-message-chip-code generator 172 generates a second message-chip-code signal, $g_2(t)$. Synchronous timing of the message-chip-code signals is provided by the generic-chip-code signal, although other sources can be used such as a common clock signal for synchronization. The EXCLUSIVE-OR device 103 generates a spread-spectrum signal by spread-spectrum processing the first data signal with the first message-chip-code signal. The EXCLUSIVE-OR device 173 generates a spread-spectrum signal by spread-spectrum processing the second message data, $d_2(t)$, with the second message-chip-code signal, $g_2(t)$. The spread-spectrum processing may be accomplished by modulo-2 adding the respective data signal to the respective message-chip-code signal. The combiner 105 combines the generic-chip-code signal with the plurality of spread-spectrum-processed signals. The combined generic-chip-code signal and plurality of spread-spectrum-processed signals may be a multilevel signal, having the instantaneous voltage levels of the generic-chip-code signal and the plurality of spread-spectrum-processed signals.

The modulator 107, as part of the transmitter, modulates the combined generic-chip-code signal and the plurality of spread-spectrum-processed signals by a carrier signal, $\cos w_0 t$, at a carrier frequency, $f_0$. The modulated generic-chip-code signal and spread-spectrum processed signal are transmitted over the communications channel 110 as a first spread-spectrum-communications signal, $x_c(t)$. Thus, the spread-spectrum-communications signal includes the generic-chip-code signal and the spread-spectrum-processed signal as if they were each modulated separately, and synchronously, on separate carrier signals having the same carrier frequency, $f_o$, and transmitted over the communications channel.

With the use of the invention as embodied in FIGS. 9 and 10, a generic-spread-spectrum channel, as part of each received spread-spectrum-communications signal, provides a recovered-carrier signal. For each spread-spectrum receiver, and as illustrated with the first spread-spectrum receiver, the acquisition and tracking circuit 253 acquires and tracks the recovered-carrier signal from an output of the generic-bandpass filter 245. For the first spread-spectrum receiver, by way of example, the replica of the generic-chip-code signal from the receiver-generic-chip-code generator 241 is synchronized to the recovered-carrier signal via acquisition and tracking circuit 253. The receiver-generic-chip-code generator 241 generates a replica of the generic-chip-code signal, $g_0(t)$, which provides timing to first bit synchronizer 229 and to the first receiver-message-chip-code generator 222.

The receiver-generic-chip-code generator 241 generates a replica of the first generic-chip-code signal, $g_0(t)$. The generic mixer 243 uses the replica of the generic-chip-code signal for despreading the spread-spectrum-communications signal, $x_c(t)$, from the power splitter 115, as a recovered-carrier signal. The spread-spectrum channel, of the received spread-spectrum-communications signal having the generic chip-code signal, $g_0(t) \cos w_0 t$, generally does not include data so that despreading the received spread-spectrum-communications signal produces the carrier signal, only. The generic-bandpass filter 245 filters the recovered-carrier signal at the carrier frequency, or equivalently, at an intermediate frequency (IF). In comparison to a message-bandpass filter which has a bandwidth sufficiently wide for filtering a modulated-data signal, the generic-bandpass filter 245 can have a very narrow bandwidth for filtering the recovered carrier signal. The very narrow bandwidth of the generic-bandpass filter 245 assists in extracting the recovered carrier signal from noise.

The recovered-carrier signal is used to synchronize the step of generating a replica of the generic chip-code signal. More particularly, a replica of the generic-chip-code signal is correlated with the received spread-spectrum-communications signal, which has a generic channel defined by the generic-chip-code signal at the spread-spectrum transmitter. If the signal out of the generic-bandpass filter 245 is small, then the acquisition and tracking circuit 253 delays the phase of the replica of the generic-chip-code signal and the correlation process is repeated. If the phases of the replica of the generic-chip-code signal and the generic-chip-code signal in the received spread-spectrum-communications signal are the same, then the output of the generic-bandpass filter 245 is at a high voltage level.

The acquisition and tracking circuit 253 acquires and tracks the recovered-carrier signal from an output of the generic-bandpass filter 245. The replica of the generic-chip-code signal from the receiver-generic-chip-code generator 245 is synchronized to the recovered-carrier signal via acquisition and tracking circuit 253.

The first receiver-message-chip-code generator 222 generates a replica of the first message-chip-code signa, $g_1(t)$. The replica of the first message-chip-code signal, $g_1(t)$, is synchronized to the replica of the generic-chip-code signal, $g_0(t)$, from the receiver-generic-chip-code generator 241. Thus, the first receiver-message-chip-code generator 222, via synchronization to the receiver-generic-chip-code generator 241, has the same synchronization as the transmitter-message-chip-code generator 102 via synchronization to the transmitter-generic-chip-code generator 101. Accordingly, the spread-spectrum communications channel having the generic-chip-code signal provides coherent spread-spectrum demodulation, i.e. coherent bit synchronization, of the spread-spectrum channels with data.

The first message mixer 224 uses the replica of the message-chip-code signal $g_1(t)$, for despreading the received spread-spectrum-communications signal, from the power splitter 115, to generate a first modulated-data signal, $d_{R1}(t) \cos w_o t$. The modulated-data signal effectively is the first message-data signal modulated by the carrier signal. The message-bandpass filter 126 filters the first modulated-data signal at the carrier frequency, or equivalently at an intermediate frequency (IF). down converters, which convert the modulated-data signal to an IF, optionally may be used without altering the cooperative functions or teachings of the present invention.

More generally, the plurality of message mixers generate replicas of the plurality of message-chip-code signals, $g_1(t), g_2(t), \ldots, g_n(t)$, respectively. The plurality of message mixers mix the plurality of received spread-spectrum-communications signal with the replicas of the plurality of message-chip-code signals to generate the plurality of modulated-data-signals, respectively. The plurality of message-bandpass filters filter the plurality of modulated-data signals, respectively.

Referring to FIG. 9, the first date detector 228 demodulates the modulated-data signal as a detected signal. The detected signal is filtered through first lowpass filter 228, sampled by electronic switch 231 and outputted as a first demodulated signal, $d_{R1}(t)$. The demodulated signal, without errors, is identical to the first message-data signal. The first lowpass filter 230 and first electronic switch 231 operate in an "integrate and dump" function, respectively, under the control of the first bit synchronizer 229.

The first bit synchronizer 229 controls the integrating and dumping of first lowpass filter 230 and first electronic switch 231. The first bit synchronizer 229 preferably derives synchronization using the replica of the generic-chip-code signal, or other synchronization signal, from the receiver-generic-chip-code generator 241 as illustrated in FIG. 3. The first bit synchronizer also may derive synchronization from an output of the first date detector 228, as illustrated in FIG. 3, when a generic-chip-code signal is not used.

In a preferred embodiment, the first bit synchronizer 229 receives the replica of the generic-chip-code signal, $g_0(t)$, from the receiver-generic-chip-code generator 241. The replica of the generic-chip-code signal, by way of example, may include a chip codeword having 8250 chips. Assuming that there are eleven bits per chip codeword, then there are 750 chips per bit of data. Since the replica of the generic-chip-code signal provides information to the bit synchronizer 129 as to where the chip codeword begins, the first bit synchronizer 229 thereby knows the timing of the corresponding bits for synchronization.

In FIG. 10, demodulation of each modulated data signal from the plurality of spread-spectrum receivers is performed using data demodulator 338, similar to the data demodulation of FIG. 3, as a time share. The decoder 340 can be used at the output of the data demodulator 338.

The plurality of demodulated signals, which are analog signals, of FIGS. 9 and 10 are combined by combiner 260 to generate the received-message signal. The received-message signal is an analog combination of the demodulated signals. The received-message signal is the message data or message signals originally transmitted by the plurality of spread-spectrum transmitters.

The present invention also includes a method for synchronously demodulating a spread-spectrum-communications signal. Message data are input to the spreading means. Referring to FIG. 11, for the spread-spectrum transmitter, the method comprises the steps of generating 403 a generic-chip-code signal. The method further includes generating 405 a plurality of message data and generating 407 a plurality of message-chip-code signal synchronized to the generic-chip-code signal, or other clock signal. The plurality of message data are processed 408, using a plurality of spread-spectrum modulators, with the plurality of message-chip-code signals, respectively, to generate a plurality of spread-spectrum-processed signals. The generic-chip-code signal is combined 409 with the plurality of spread-spectrum-processed signals. The method transmits 411 the combined generic-chip-code signal and plurality of spread-spectrum-processed signals on a carrier signal over the communications channel as a spread-spectrum-communications signal.

The present invention further includes a method for receiving spread-spectrum conference calls. The receiving method uses a replica of generic-chip-code signal used by spread-spectrum transmitter for recovering 413 a carrier signal from the spread-spectrum-communications signal, and acquiring and tracking the recovered-carrier signal. The replica of the generic-chip-code signal is synchronized to the recovered-carrier signal. The method includes generating a plurality of replica of the message-chip-code signals synchronized to the replica of the generic-chip-code signal. The plurality of replica of the message-chip-code signal is used to despread 415 one of the plurality of the received spread-spectrum-communications signals, respectively, as a plurality of modulated-data signals. The plurality of modulated-data signals are demodulated 417 as a plurality of received data.

The receiving method also may have the demodulating step include synchronously demodulating 415, using the recovered-carrier signal, the modulated-data signal as a detected signal, or nonsynchronously demodulating, using an envelope detector, the modulated-data signal to the demodulated signal. A plurality of demodulated data signals are combined 419 as a received-message signal.

It will be apparent to those skilled in the art that various modifications can be made to the spread-spectrum conference calling system and method of the instant invention without departing from the scope or spirit of the invention, and it is intended that the present invention cover modifications and variations of the spread-spectrum conference calling system and method provided they come in the scope of the appended claims and their equivalents.

I claim:

1. A spread-spectrum conference calling communications system for simultaneously listening to a plurality of spread-spectrum channels of a spread-spectrum-communications signal comprising:

generic-spread-spectrum-processing means for recovering a carrier signal from the spread-spectrum-communications signal and for generating a replica of a generic-chip-code signal; and a plurality of spread-spectrum receivers, each of said spread-spectrum receivers including, acquisition means responsive to acquiring and tracking the recovered carrier signal for synchronizing said generic-spread-spectrum-processing means to the recovered carrier signal;

message-spread-spectrum-processing means for despreading the spread-spectrum-communications signal as a plurality of modulated-data signals; and demodulation means for demodulating the modulated-data signal as a demodulated signal, said demodulation means including detection means for sequentially detecting each of the plurality of modulated-data signals as a detected signal, respectively.

2. The spread-spectrum communications system as set forth in claim 1 wherein each of said generic-spread-spectrum-processing means includes a generic mixer for recovering the carrier signal from the spread-spectrum-communications signal;

each of said message-spread-spectrum-processing means includes a message mixer for despreading the spread-spectrum-communications signal as the modulated-data signal; and each of said detection means includes an envelope detector for detecting the modulated-data signal as the detected signal.

3. The spread-spectrum communications system as set forth in claim 1 wherein detection means includes a synchronous detector responsive to the recovered-carrier signal for converting the modulated-data signal to the detected signal.

4. The spread-spectrum communications system as set forth in claim 3 wherein said detection means includes a synchronous detector responsive to the recovered-carrier signal for synchronously demodulating the modulated-data signal as a detected signal.

5. The spread-spectrum communications system as set forth in claim 3 wherein said detection means includes an envelope detector for converting the modulated-data signal to the detected signal.

6. A method for receiving spread-spectrum conference calls, comprising the steps of:

recovering, using a replica of a generic-chip-code signal, a carrier signal from a spread-spectrum-communications signal;

acquiring and tracking the recovered-carrier signal;

generating the replica of the generic-chip-code signal synchronized to the recovered-carrier signal;

generating a replica of the message-chip-code signal; synchronized to the replica of the generic-chip-code signal;

despreading, using the replica of the message-chip-code signal, the spread-spectrum-communications signal as a modulated-data signal;

synchronizing the replica of the generic-chip-code signal to the recovered carrier signal; and demodulating the modulated-data signal as received data.

7. The method as set forth in claim 6 wherein the demodulating step includes synchronously demodulating, using the recovered carrier signal, the modulated-data signal as a detected signal.

8. A spread-spectrum conference calling communications system for simultaneously listening to a plurality of spread-spectrum channels of a spread-spectrum-communications signal comprising:

generic-spread-spectrum-processing means for recovering a carrier signal from the spread-spectrum-communications signal and for generating a replica of a generic-chip-code signal; and a plurality of spread-spectrum receivers, each of said spread-spectrum receivers including, acquisition means responsive to acquiring and tracking the recovered carrier signal for synchronizing said generic-spread-spectrum-processing means to the recovered carrier signal;

message-spread-spectrum-processing means for despreading the spread-spectrum-communications signal as a plurality of modulated-data signals; and demodulation means for demodulating the modulated-data signal as a demodulated signal.

9. The spread-spectrum communications system as set forth in claim 8 wherein each of said demodulation means further includes detection means for converting a modulated-data signal to a detected signal.

10. The spread-spectrum communications system as set forth in claim 9 wherein each of said demodulation means further includes bit-synchronization means for integrating and dumping the detected signal as the demodulated signal.

11. The spread-spectrum communication system as set forth in claim 10 wherein each of said plurality of spread-spectrum receivers further includes combiner means for combining each of the demodulated signals to generate a received-message signal.

12. The spread-spectrum communications system as set forth in claim 11 wherein each of said plurality of spread-spectrum receivers further includes switching means for switching the demodulation means between the message-spread-spectrum-processing means and the combining means, respectively.

13. A spread-spectrum conference calling communications system for simultaneously listening to a plurality of spread-spectrum channels of a spread-spectrum-communications signal comprising:

a receiver-generic-chip-code generator for recovering a carrier signal from the spread-spectrum-communications signal and for generating a replica of a generic-chip-code signal; and a plurality of spread-spectrum receivers, each of said spread-spectrum receivers including, an acquisition and tracking circuit, responsive to acquiring and tracking the recovered carrier signal, for synchronizing said receiver-generic-chip-code generator to the recovered carrier signal;

a receiver-message-chip-code generator for despreading the spread-spectrum-communications signal as a plurality of modulated-data signals; and demodulation means for demodulating the modulated-data signal as a demodulated signal.

14. The spread-spectrum communications system as set forth in claim 13 wherein each of said demodulation means further includes a data detector for converting a modulated-data signal to a detected signal.

15. The spread-spectrum communications system as set forth in claim 14 wherein each of said demodulation means further includes a bit synchronizer for integrating and dumping the detected signal as the demodulated signal.

16. The spread-spectrum communication system as set forth in claim 15 wherein each of said plurality of spread-spectrum receivers further includes a combiner for combining each of the demodulated signals to generate a received-message signal.

17. The spread-spectrum communications system as set forth in claim 16 wherein each of said plurality of spread-spectrum receivers further includes a switch for switching the demodulation means between the receiver-message-chip-code generator and the combiner, respectively.

* * * * *